United States Patent
Prytz et al.

(10) Patent No.: US 9,674,073 B2
(45) Date of Patent: Jun. 6, 2017

(54) METHOD AND ARRANGEMENT FOR ROUTE COST DETERMINATION AND SELECTION WITH LINK COST INTERACTION

(75) Inventors: Mikael Prytz, Rönninge (SE); Joachim Sachs, Aachen (DE); Per Magnusson, Linköping (SE); Johan Lundsjö, Spånga (SE); Peter Larsson, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1583 days.

(21) Appl. No.: 11/917,112

(22) PCT Filed: Dec. 1, 2005

(86) PCT No.: PCT/SE2005/001811
§ 371 (c)(1),
(2), (4) Date: May 30, 2008

(87) PCT Pub. No.: WO2006/137764
PCT Pub. Date: Dec. 28, 2006

(65) Prior Publication Data
US 2009/0175172 A1    Jul. 9, 2009

(30) Foreign Application Priority Data
Jun. 22, 2005 (WO) ................. PCT/SE2005/000982

(51) Int. Cl.
*H04L 12/721* (2013.01)
*H04L 12/735* (2013.01)
*H04W 40/00* (2009.01)

(52) U.S. Cl.
CPC ............ *H04L 45/123* (2013.01); *H04L 45/12* (2013.01); *H04L 45/1283* (2013.01); *H04W 40/00* (2013.01)

(58) Field of Classification Search
CPC ..... H04L 45/12; H04L 45/123; H04L 45/124; H04L 45/128; H04L 45/1283; H04W 40/00; H04W 40/02; H04W 40/16
See application file for complete search history.

(56) References Cited

U.S. PATENT DOCUMENTS 5,491,837 A * 2/1996 Haartsen ...................... 455/62
5,724,378 A * 3/1998 Miki et al. .................... 375/148
(Continued)

FOREIGN PATENT DOCUMENTS

| EP | 1473887 A2 | 11/2004 |
| JP | 2003218917 A | 7/2003 |
| WO | 2004/111775 | 12/2004 |

*Primary Examiner* — Khoa Huynh
(74) *Attorney, Agent, or Firm* — Patent Portfolio Builders, PLLC

(57) ABSTRACT

This invention extends routing mechanisms that use link metrics for route selection so that: A link metric cross correlation vector is determined for all links, where each element in the vector corresponds to some other link, and reflects the change in the link metric value if a data flow would already use this other link. The invention further describes a specific embodiment where all cross-correlating links are adjacent to each other, i.e., they terminate or originate in a common node. A mechanism is described to create an extended routing graph. This extended graph permits the use of standard polynomial time algorithms that simultaneously construct the optimal route and find the optimal route metric (such as shortest-path algorithms) also for the adjacent link cross-correlating case.

28 Claims, 5 Drawing Sheets

(56) References Cited

U.S. PATENT DOCUMENTS

| | | |
|---|---|---|
| 6,795,399 B1 * | 9/2004 | Benmohamed et al. ..... 370/235 |
| 2002/0013856 A1 * | 1/2002 | Garcia-Luna-Aceves et al. ............................. 709/238 |
| 2002/0049561 A1 | 4/2002 | Garcia-Luna-Aceves et al. |
| 2003/0005149 A1 | 1/2003 | Haas et al. |
| 2004/0032847 A1 * | 2/2004 | Cain ............................. 370/338 |
| 2005/0083848 A1 * | 4/2005 | Shao et al. .................... 370/238 |
| 2005/0265288 A1 * | 12/2005 | Liu et al. ...................... 370/332 |
| 2005/0286426 A1 * | 12/2005 | Padhye et al. ................ 370/238 |

* cited by examiner

METHOD AND ARRANGEMENT FOR ROUTE COST DETERMINATION AND SELECTION WITH LINK COST INTERACTION

TECHNICAL FIELD

The present invention relates to a communication network, and in particular to a method of routing traffic based on cross-correlation link metric values.

BACKGROUND OF THE INVENTION

The present invention applies to a communication network in which data can be transmitted from a sender to a receiver via a number of intermediate network nodes. Data can be transmitted via different routes, usually comprising one or more of the intermediate network nodes. A direct path between two adjacent nodes is referred to as a link. Depending on which communication links are used for a communication flow different transmission routes (or paths) through the network from the sender to the receiver can be distinguished.

It is important in any such communication system to optimize the selection of the routes to utilize the resources as efficiently as possible.

In existing routing solutions a route selection is typically based on assigning a cost value, or metric, to each communication route, that is, a route metric. The route metric is generally determined as the sum of the metric values for all links, or hops, in the route. The link metric values are often used to reflect the "quality" or utility of a particular link in relation to some performance objective. Typically, but not necessarily, each node determines link metric values for its own link interfaces and the values are distributed to other nodes using routing protocols. The best route is typically selected to be the route that has the best route metric.

In the prior art as described above each link is considered independently. The possible effect on a link of changes in any other link is not considered.

The "quality" or utility of a link can be affected by what happens in other links. This can be the case, e.g., for different links sharing the same medium or channel, for example, the same CSMA medium used for transmission on different hops, with joined contention different links transmitting on different channels which interfere with each other, for example, different radio access technologies using the same or adjacent spectrum transmission of different links using common processing power, memory or other common resources, for example, if the links are within the same node and use the common DSP, RAM resources In multi-radio multi-hop networks, usually a number of different links exist to and from the communication nodes, the links using different radio access technologies or channels. In such a scenario, a routing decision where the route metric is only considered based on the individual link metrics leads to a non-optimal solution, since the interfering effect of different links in a route is not considered.

OBJECT OF THE INVENTION

It is an object of the present invention to enable more efficient use of network resources by improving routing through the network.

SUMMARY OF THE INVENTION

The basic idea underlying the invention is to reflect the interaction and coupling between the existing and potentially forthcoming links in the link metric, when determining a new route for data traffic. This invention improves the performance, service quality support, and capacity of communication networks by improving the routing decisions.

Briefly, the coupling between links relates to the physical layer including transmit power level and the path gain between a transmitter and an unintended receiver, but more importantly to the traffic load on a link as well as resource sharing constraints on, e.g., processing power or memory. In particular, a linear model of link metric interaction is proposed as one embodiment of the invention. A linear model (first order approximation) simplifies the problem and is accurate when the expected interaction change is relatively small in comparison to the link metric value. This is typically the case when traffic load is the dominating interaction factor.

This invention extends routing mechanisms that use link metrics for route selection so that:

A link metric cross correlation vector is determined for each link a, where an element in the vector corresponds to some other link b reflecting the change in the link metric value of a if a data flow would already use this other link b.

In a specific embodiment all cross-correlating links (those with non-zero values in the cross correlation vector) are adjacent to each other, i.e., they terminate or originate in a common node.

A mechanism is described to create an extended routing graph. This extended graph permits the use of standard polynomial time algorithms that simultaneously construct the optimal route and find the optimal route metric (such as shortest-path algorithms) also for the adjacent link cross-correlating case.

The idea is preferably realised primarily through extending routing mechanisms where each link has an associated link metric prior to route setup and the metric reflects the coupling between existing active links.

At route setup, a route is selected that minimizes a route metric, where the latter is composed of new updated link metrics along said route and the new updated link metrics is based on the old link metrics and the coupling between links.

Specifically, a link metric cross correlation vector is determined for each link a in addition to the metric value. Each element in this vector corresponds to some other link b. It is a measure of how the link metric value on a changes if the route selected for a data flow also uses link b.

Route selection mechanisms can use the link metric cross correlation vector to, e.g., avoid paths where the presence of a data flow in the preceding or following hops of two or more consecutive links unfavorably affects the link metric of the middle hop.

As the skilled person will readily understand, the invention can be applied to any routed communication network. However, the invention is particularly useful in wireless multi-hop networks with heterogeneous link technologies (e.g., radio access technologies). If two different link technologies are available between the same pair of nodes, then according to the invention they are treated as separate links with separate link metrics and link metric cross correlation vectors.

Note that this approach is particularly useful when combined with a predictive routing algorithm as described in co-pending application PCT/SE2005/000948, where the predicted metric after the admission of a new traffic flow to a path is considered for the routing decision.

BRIEF DESCRIPTION OF THE DRAWINGS

In the following embodiments of the invention will be described in more detail, with reference to the appended drawings, in which.

DETAILED DESCRIPTION OF EMBODIMENTS

Figure 1:
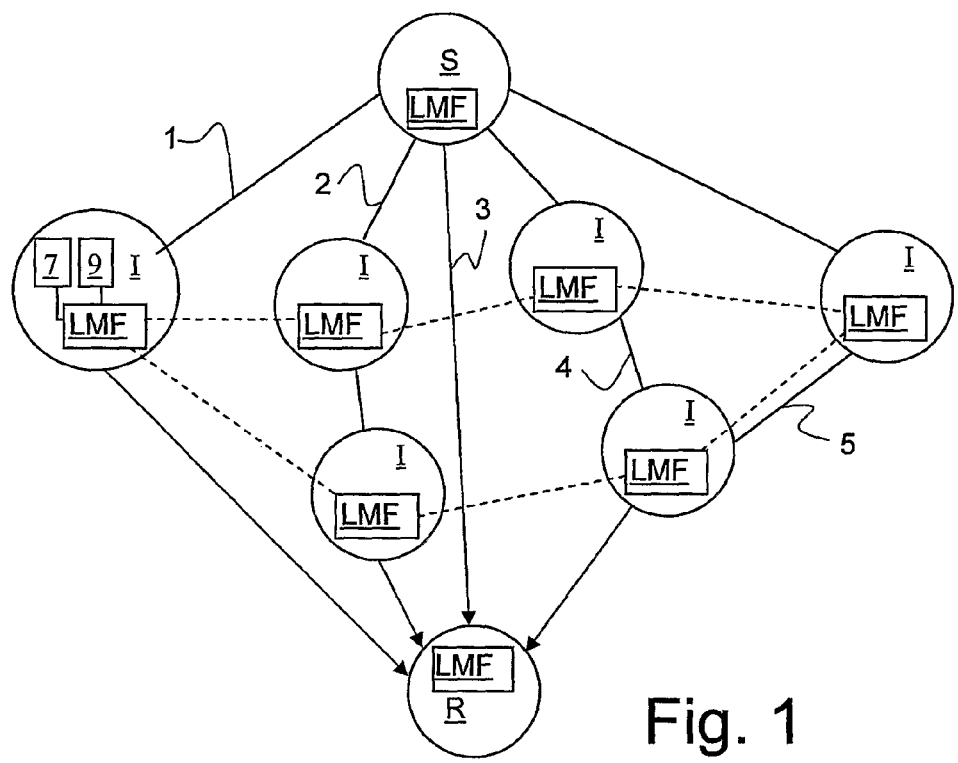
FIG. 1 illustrates schematically transmission via a number of possible routes through a communication network.

This invention extends link metric based routing mechanisms by introducing a link metric cross correlation vector $\sigma_a$ for each link a in addition to the link metric $m_a$. Consider now the routing problem for a given data flow. Each component $\sigma_a^b$ in the vector is a measure of how the link metric value $m_a$ on link a changes if the route selected for the flow also uses link b. Note that some components in $\sigma_a$ may be zero, which can mean that the corresponding link metrics are uncorrelated with $m_a$ or that no correlation information is available. In practice $\sigma_a$ may also be implemented as a set, where the elements are the pairs $(b, \sigma_a^b)$ for which there is a correlation and/or information exists. The self-correlation $\sigma_a^a$ is the self-induced change in the link metric value when the data flow uses the link.

Estimated Correlation-Corrected Link and Route Metrics

The link metric cross correlation vector $\sigma_a$ can be used by route selection mechanisms when computing route metrics and evaluating paths. A mechanism can, given a path $p \in P$ where P is a set of candidate paths, compute estimated correlation-corrected link metrics $\overline{m_a}$ as a function $f$ of the link metric m and cross correlation vector $\sigma$, that is:

$$\overline{m_a} = f_a(m_a, \sigma_a^p), \quad (1)$$

for all links a in p, where $\sigma_l^p = (\sigma_l^{a_1}, \ldots, \sigma_l^{a_{|p|}})$ are the components in $\sigma_a$ corresponding to the links $b_1, \ldots, b_{|p|}$ in a path p. The estimated correlation-corrected route metric can then be computed as appropriate, e.g., as the sum of the link metrics $\overline{m_a}$.

In practice a linear model (first order approximation) can be used for the link metric interaction. The estimated correlation-corrected link metrics then can be computed as the sum of the link metric and the cross correlation values of the links in p:

$$\overline{m_a} = m_a + \sum_{b \in p} \sigma_a^b. \quad (2)$$

Construction of Routes

The computation approach outlined above assumes that a set P of candidate paths p is formed first and then the estimated correlation-corrected route metric of each path $p \in P$ is evaluated. In general this is necessary since each link can have a large number of possible estimated correlation-corrected link metric values (up to one value per candidate path) and the right one to choose is not decided until the path is selected. However, it is usually not feasible to enumerate all possible candidate paths in a network since the number of paths grows exponentially with the number of nodes/links.

In the following it will be discussed how to determine which paths are to be included in the set P of candidate paths. One practical method for determining P is to:

1. Ignore the link metric cross-correlation vectors $\sigma_a$ on all links a and use only the ordinary link metrics $m_a$.
2. Use a k-path route construction method, e.g., a k-shortest path algorithm to find the k shortest paths (the shortest, the second shortest, etc. up to the kth shortest) with respect to the link metrics $m_a$ (see, e.g., Eppstein [1]).
3. Let P be the k paths thus found.

This method will not find the optimal path with respect to the estimated correlation-corrected link metrics $\overline{m_a}$, but may be effective in practice even if the number k of candidate paths is small.

In some cases it is possible to compute the optimal path with respect to $\overline{m_a}$ directly, without resorting to exhaustive enumeration. One such case is when the link metrics are only cross-correlated with metrics of adjacent links, i.e., links that share a common node. This particular case will be described below.

The general case where link metrics can correlate with any other link metric likely requires a centralized routing function. For the case with only adjacent link metric cross-correlation, standard combinatorial route construction algorithms can be used. This admits at least a de-centralized operation where each node obtains a network view from routing protocols that propagate link information. Here the link metric correlation vectors $\sigma_a$ can be piggybacked on the link information, including the ordinary link metric values $m_a$, which is propagated by any existing routing protocol.

Determining the Cross-Correlation Values

There are a variety of methods for finding the correlation vectors $\sigma_a$:

for links a which are terminated (or otherwise somehow controlled) at some central entity this correlation can be fairly exact based on detailed knowledge, e.g., about resource (such as time-slot, frequency, code, etc) to be scheduled, power level, etc for links a which are not controlled in a central way (links to/from different nodes) but which still interfere due to overlap in frequency/range/time a vaguer scheme of determining the correlation of metrics can be done, e.g., by observation over time how link metrics are correlated.

The latter case above can be accomplished by observing the link metrics before and after a routing case. Consider one link a on p. Let $m_a$ and $m'_a$ be the metric values of the link a before and after routing a flow on a path p. Without any a priori knowledge on how the link metric of this link correlates with the link metrics of the other links b in p, it is difficult to determine which link(s) induce the change from $m_a$ to $m'_a$ and how much this routing case represents the average cross-correlation behavior. In general an updated estimate of the cross-correlation value can be expressed as:

$$\sigma_a^b(\text{new}) = g(\sigma_a^b, \alpha_a^b h(m_a, m'_a)), \quad (3)$$

where g and h are some functions and $\alpha_a^b$ is a weight factor representing the probable influence of link b. The weight factor can, e.g., represent geographical distance if it is believed that links that are geographically close to each other are more likely to have correlating link metrics. The function h can be simply the difference between the link metrics and the function g could be a weighted combination or some moving average.

A problem with correlation vectors $\sigma_a$ is that they depend on the link metrics $m_a$, i.e., it may be that if routes are changed for many paths during the routing-decision the correlation values will change as well. How the correlation values will change might be hard to estimate as these may have a non-trivial relation to the absolute link metrics (non-linear) and in some cases be based on observations. This means that there might be practical limits on the amount of paths that can be considered in a single routing decision.

One approach to handling the dependencies between the link metrics and the cross correlation vectors is to combine the method with a predictive routing algorithm as described in the above-mentioned co-pending application, where the predicted metric after the admission of a new traffic flow to a path is considered for the routing decision. In the terminology of the present invention the predictive routing algorithm can be viewed as estimating the self-correlation $\sigma_a^a$. The combined method naturally extends the prediction to all components of $\sigma_a$.

FIG. 1 illustrates schematically transmission of data from a sender S to a receiver R via a number of possible routes through a communication network. The network comprises a number of intermediate nodes I, through which the data can be routed. In FIG. 1, five different routes 1, 2, 3, 4, 5 are shown. Each node typically comprises a link metric function unit LMF, which controls and/or monitors the link characteristics needed for determining a link metric for the link starting at the node. Link metrics for each node are communicated to the link metric function units of other nodes, as indicated by the dashed lines in FIG. 1. If a node does not have a link metric function unit, the link metrics for this node may be determined in another node.

One or more of the nodes I, S, R may also comprise a path determining unit 7 for determining the set of possible paths, as discussed above. In addition one or more nodes I may comprise a cross-correlation value determining unit 9 for updating the cross-correlation values as discussed above. In FIG. 1, for simplicity, these units 7, 9 are only shown in one of the nodes I. Alternatively, the functions of the path determining unit 7 and the cross-correlation value determining unit 9 may be performed by the link metric function unit LMF. The LMF also communicates the path and cross-correlation information determined to the other nodes in the network.

Figure 2A:
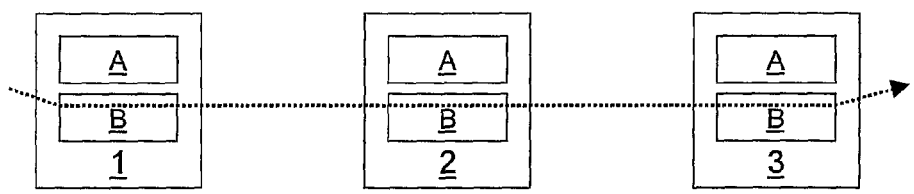
FIGS. 2A, 2B and 2C illustrate routing according to the invention in a first example network.
Figure 2B:
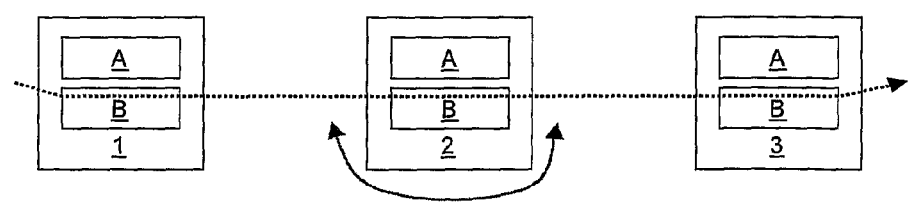
Figure 2C:
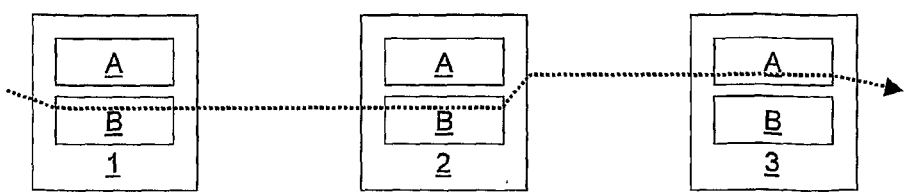

FIGS. 2A, 2B and 2C illustrate how the link metric cross-correlation vectors can improve on the routing decision. Each of FIGS. 2A, 2B and 2C shows a network of three nodes, 1, 2, and 3, that each can use two different link technologies, A and B. A route selection for a data flow from node 1 to node 3 shall be made. The four "natural" single paths are considered as candidates. The routing mechanism uses link metrics for route selection.

The link metric values before the routing decision for the four links are shown in Table 1. A12 denotes the path from node 1 to node 2 using technology A, A23 denotes the path from node 2 to node 3 using technology A, B12 denotes the path from node 1 to node 2 using technology B, B23 denotes the path from node 2 to node 3 using technology B,

TABLE 1

|  | A12 | A23 | B12 | B23 |
|---|---|---|---|---|
| Link metric | 2 | 2.5 | 1 | 2 |

The dashed line of FIG. 2A indicates the best route {B12, B23} as determined based on these link metrics. In this example it is selected as the route with the least link metric sum.

FIG. 2B and Table 2 shows the situation after the routing decision, i.e., if the dashed route {B12, B23} is selected and used for the data flow.

TABLE 2

|  | A12 | A23 | B12 | B23 |
|---|---|---|---|---|
| Link metric | 2 | 2.5 | 1.1 | 4 |

As can be seen in Table 2, in this example, the link metric values for the two links B12 and B23 have increased (for B23 significantly) as a result of the route selection. The reason for the increase can be that one of the links became very loaded following the routing, or that the two hops use the same link technology in this route and that they have to share resources or that they interfere with each other. A consequence is that the selected route was, after all, maybe not the best possible.

In FIG. 2C, and table 3, the link metrics have been complemented with link metric cross correlation vectors and adjusted link metrics for two paths {B12, A23} and {B12, B23}. The adjusted link metrics for the selected links in the first path are calculated according to the following (the adjusted link metrics for the second path are similarly computed):

$$\overline{m}_{B12} = m_{B12} + \sigma_{B12}^{A23} = 1.1$$

and $$\overline{m}_{A23} = m_{A23} + \sigma_{A23}^{B12} = 2.6$$

TABLE 3

|  | A12 | A23 | B12 | B23 |
|---|---|---|---|---|
| Link metric | 2 | 2.5 | 1 | 2 |
| Cross correlation | $\sigma_{A12}(A23) = 0.1$ | $\sigma_{A23}(A12) = 0.5$ | $\sigma_{B12}(A23) = 0.1$ | $\sigma_{B23}(A12) = 0.1$ |
| Cross correlation | $\sigma_{A12}(B23) = 0.1$ | $\sigma_{A23}(B12) = 0.1$ | $\sigma_{B12}(B23) = 0.1$ | $\sigma_{B23}(B12) = 2$ |
| Adjusted link metric for path {B12, A23} |  | 2.6 | 1.1 |  |
| Adjusted link metric for path {B12, B23} |  |  | 1.1 | 4 | sion. Each of FIGS. 2A, 2B and 2C shows a network of three nodes, 1, 2, and 3, that each can use two different link The routing mechanism can now use the link metric cross correlation vectors to determine the routing path. The dashed line again indicates the best route, which in this example is selected as the route with the smallest sum of the estimated correlation-corrected link metrics.

The path {B12, A23} is clearly better than {B12, B23} (in the sense of the route metric) since the actual link metric sum was reduced from 5,1 to 3,7.

Figure 3:
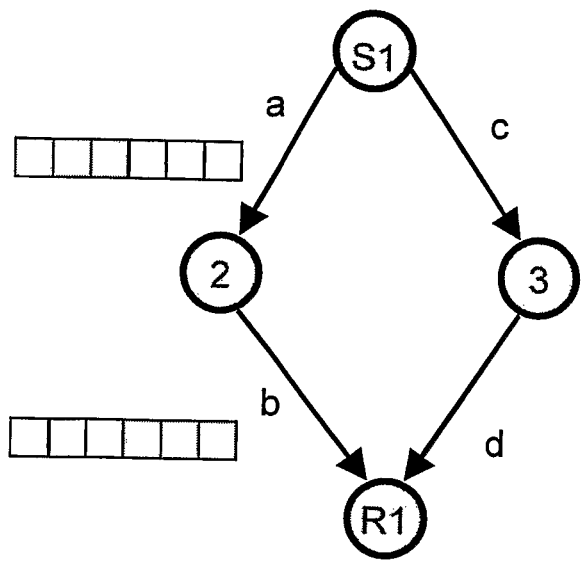
FIG. 3 illustrates routing according to the invention in a second example network.

FIG. 3 illustrates routing according to the invention in another example of routing between a sender S1 and a receiver R1. Two paths are possible, each consisting of two links, a and b (via node 2), and c and d (via node 3), respectively. In this example, it is assumed that the capacity c on each link is 6 units and that currently $f$=3 units are used on all links (it is assumed that only integer units of capacity can be used). The link metrics are assumed to be inversely proportional to the remaining capacity on each link, i.e., currently each link metric value can be expressed as:

$$m = \frac{c}{c-f} = \frac{6}{6-3} = 2. \quad (4)$$

This implies that the two paths from node S1 to node R1 are equally good (under this metric) and that they are equally likely to be used for an immediate routing case. It should be noted that this is a simplified expression that, for example, does not consider the case when f=c. In practice this case would be handled either by letting m be some (large) number when f=c or by replacing the capacity c in the expression by, e.g., c'=c+ϵ where ϵ is a small number.

Suppose now that links a and b use the same link technology and that they have to share time slots (links c and d use different link technologies and do not have correlated link metrics). Assume further that node 2 cannot receive and transmit simultaneously. Because of this there are situations when time slots are available on both link a and link b, yet they cannot be used together. One such situation is shown in the figure by the set of boxes next to links a and b. Here each box is a time slot and a shaded box is an occupied slot. The two links have free time slots available, but because of the simultaneous transmit/receive restriction there is no feasible combination of free timeslots in a and b. Suppose now that this situation occurs on average for every one hundredth routing case.

The link metric cross correlation vectors can be used to improve the routing decision, but the question is how to select the cross correlation values $\sigma_a^b$ and $\sigma_b^a$. Assume that the conflicting scenario would be measured by saying that the link metric in this case is m=2c=12. Further assume that the average load $f$ is three units. The expected metric in this case is $$\overline{m} = 0,99\frac{6}{6-3} + 0,01 \cdot 2 \cdot 6 = 2,1 = 2 + 0,1 \quad (5)$$

If additive link metric cross-correlation values are used, then a reasonable estimate in this case can be to set $\sigma_a^b = \sigma_b^a = 0,1/2 = 0,05$. This would prioritize the path over c and d under equal load situations, but still not preempt the use of the path over a and b completely.

Adjacent Link Cross Correlation—An Extended Routing Graph

A specific common case of this invention is when all cross-correlating links are adjacent, that is, when, for a given link a=(i,j), the links b where $\sigma_a^b \neq 0$ all terminate at node i or originate at node j (b is either b=(k,i) or b=(j,k) for some other node k).

If single path routes are used and if the route metric admits polynomial time algorithms that simultaneously construct the optimal route and find the optimal route metric (such as shortest-path algorithms), then all of these algorithms can still be used to find the optimal path for the adjacent link cross correlation case.

In general this is not at all straightforward to do with the link metric cross correlation vectors since each link can have a large number of possible estimated link metric values (up to one value per candidate path). To construct the optimal route and compute the optimal route metric, a method is needed that picks out the right metric to use for each link. For the adjacent link cross correlation case then the following procedure can be used.

The idea is to first create an extended routing graph, then compute the shortest path in this graph, and finally to derive the route and route metric in the original graph. Note that links are directed (i.e. (i,j) is different from (j,i)) and that all metrics and estimated metrics are assumed to be non-negative. Further, if two different link technologies (e.g., radio access technologies) are available between the same origin and destination nodes, then they are treated as separate links.

The extended routing graph is constructed by replacing each node by a number of different virtual nodes that represent the various roles that the node can have with respect to flows (a flow is here an end-to-end routing case, i.e., a path between a source and a destination node).

Figure 4:
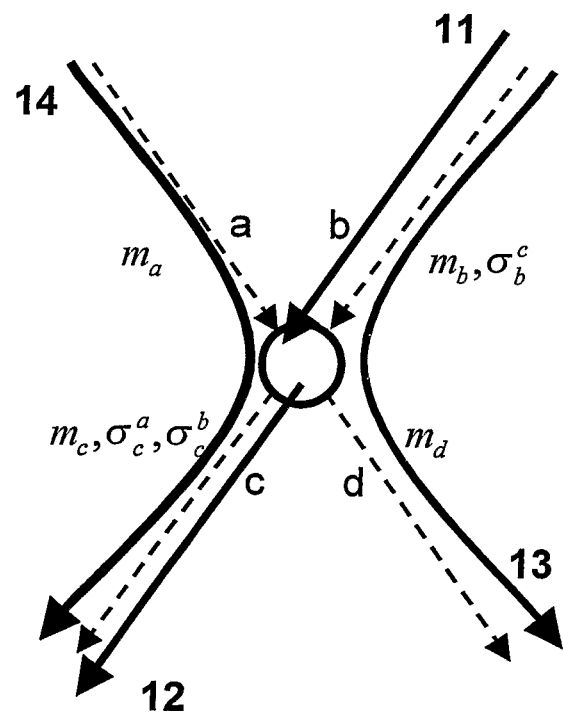
FIG. 4 shows a single node in a network, having two incoming links and two out-going links.

FIG. 4 below shows a single node with two incoming links a and b and two outgoing links c and d, all shown as dashed lines. The metric for a and d are not correlated with any other link metrics, but the metric for b is correlated with the metric for c and the metric for c is correlated with both the metric for a and the metric for b.

Four separate cases of node roles need to be distinguished:
1. The node is the final destination for a flow. In this case the metric on the incoming link is equivalent to the ordinary metric. This is true even if the incoming link metric is correlated with some outgoing link metric, since the outgoing link is not used by this flow. This situation is indicated by solid arrow 11 in FIG. 4.
2. The node is the origin for a flow. In this case the metric on the outgoing link is equivalent to the ordinary metric. The argument is similar to the one above. This situation is indicated by solid arrow 12 in FIG. 4
3. The node is a transshipment node for a flow (i.e., not the origin or the destination), and neither the incoming nor the outgoing link metrics are correlated with each other. In this case the link metric on both the incoming and outgoing links is equivalent to the corresponding ordinary metrics. This situation is indicated by solid arrow 13 in FIG. 4.
4. The node is a transshipment node for a flow, and either the incoming link metric is correlated with the outgoing link metric or the outgoing link metric is correlated with the incoming link metric or both link metrics are correlated with each other. In this case the link metric on the incoming and outgoing links need to reflect the corresponding cross-correlation values. This situation is indicated by solid arrow 14 in FIG. 4.

The four cases are shown in FIG. 4 with respect to four different flows. As an example the metric on link c is $\overline{m}_c = m_c$ when routing flow 12 but $\overline{m} = f_c(m_c, \sigma_c^a)$ when routing flow 14. The metric on link b is $\overline{m}_b=m_b$ when routing flow 11, that is, if the node in FIG. 4 were the destination. When routing flow 13 the metric becomes $\overline{m}_b=f_b(m_b,\sigma_b^c)$.

Cases 1, 2, and 3 only require one virtual node each—cases 1 and 2 apply to all flows where the node is the destination or the origin, and for case 3 the same virtual node can be used for all pairs of incoming and outgoing links with uncorrelated link metrics. However, case 4 requires one virtual node for each pair of incoming and outgoing link where either (or both) of the link metrics are correlated with the other.

Formally the extended routing graph is constructed as follows:
1. Take a node i in the original graph that has not been considered yet and add:
   a) one destination virtual node $i^t$,
   b) one origin virtual node $i^s$,
   c) one no-correlation transshipment virtual node $i_{0,0}$ provided that at least one pair of incoming and outgoing links exists where the link metrics are uncorrelated, i.e., if
   $\exists a,b:a=(k,i),b=(i,j)$ where $\sigma_a^b=0$ and $\sigma_b^a=0$, and finally
   d) one correlation transshipment virtual node $i_{a,b}$ for each pair of incoming link a and outgoing link b where either (or both) of the corresponding link metrics are correlated with the other, i.e.,
   $\forall a,b:a=(k,i),b=(i,j)$ where $\sigma_a^b \neq 0$ or/and $\sigma_b^a \neq 0$.
2. If all nodes in the original graph have been considered then go to 3, otherwise go to 1.
3. Next take a link $a=(i,j)$ in the original graph that has not been considered yet and add:
   a) one virtual link $(i^s,j^t)$ with link metric $\overline{m}=m_a$,
   b) one virtual link $(i^s,j_{0,0})$ with link metric $\overline{m}=m_a$,
   c) virtual links $(i^s,j_{a,b})$ with link metrics $\overline{m}=f_a(m_a,\sigma_a^b)$ for all b where $j_{a,b}$ exists,
   d) one virtual link $(i_{0,0},j^t)$ with link metric $\overline{m}=m_a$,
   e) one virtual link $(i_{0,0},j_{0,0})$ with link metric $\overline{m}=m_a$,
   f) virtual links $(i_{0,0},j_{a,b})$ with link metrics $\overline{m}=f_a(m_a,\sigma_a^b)$ for all b where $j_{a,b}$ exists,
   g) virtual links $(i_{b,a},j^t)$ with link metrics $\overline{m}=f_a(m_a,\sigma_a^b)$ for all b where $i_{b,a}$ exists,
   h) virtual links $(i_{b,a},j_{0,0})$ with link metrics $\overline{m}=f_a(m_a,\sigma_a^b)$ for all b where $i_{b,a}$ exists, and
   i) virtual links $(i_{b,a},j_{a,c})$ with link metrics $\overline{m}=f_a(m_a,\sigma_a^b,\sigma_a^c)$ for all b and c where $i_{b,a}$ and $j_{a,c}$ exists.
4. If all links in the original graph has been considered then terminate, otherwise go to 3.

Note that some of the cross correlation values in the link metrics in substeps 3c, 3f, 3g, 3h, and 3i may be zero. This happens when the involved correlation transshipment virtual nodes have been added to reflect the correlation of other adjacent links. However, the virtual links are still required in order to maintain the original graph's connectivity.

The procedure described above always adds destination and origin virtual nodes, but if it is known that a node will never be origin and/or destination in any routing case then the corresponding virtual nodes and links can of course be removed.

Figure 5A:
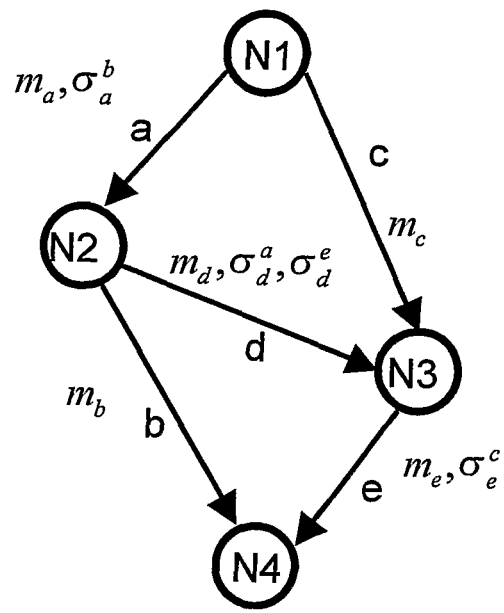
FIGS. 5A and 5B show a routing graph and a corresponding extended routing graph, respectively, according to an embodiment of the invention.
Figure 5B:
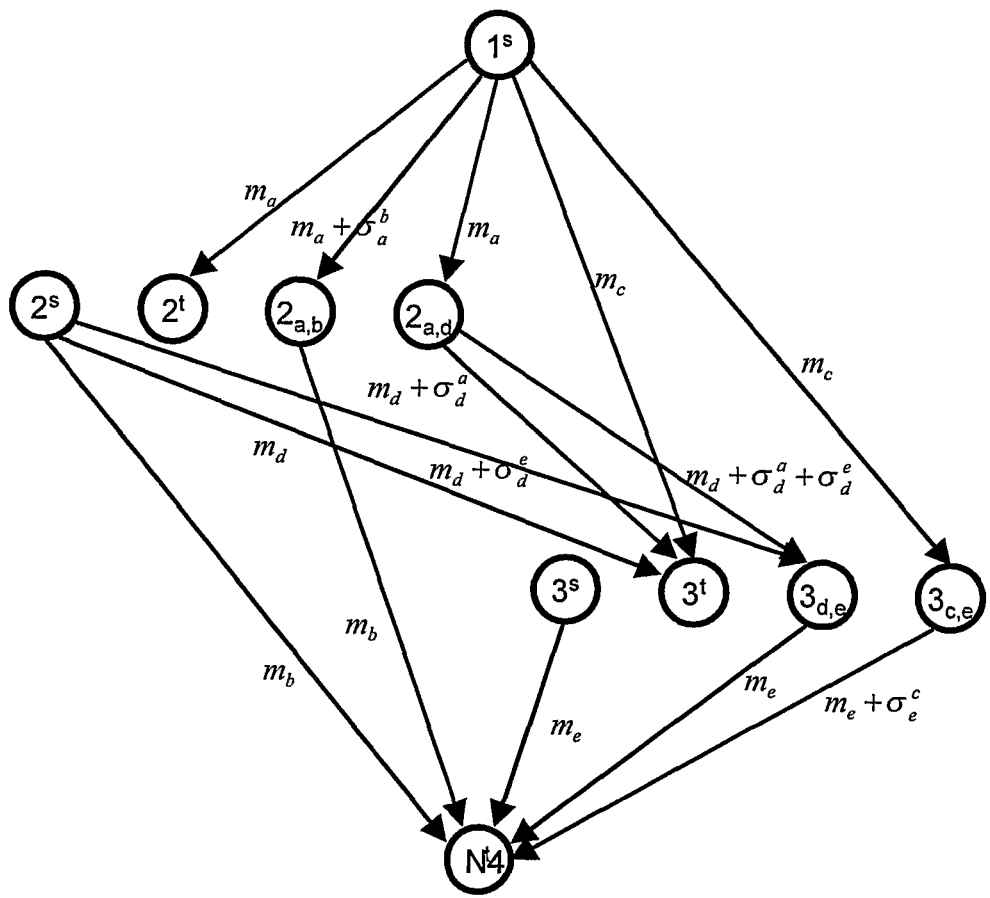

Examples of the extended routing graph construction is shown in FIGS. 5A and 5B. FIG. 5A shows the original routing graph with four nodes N1, N2, N3, N4, and five links a, b, c, d, e. The non-zero link metric cross-correlation values are also shown. FIG. 5B shows the corresponding extended routing graph. It should be noted that each of the physical nodes N2, N3 is shown a number of times as what is referred to as virtual node. Each virtual node corresponds to the node being used in a different path. For simplicity, node N1's destination virtual node and node N4's origin virtual node are not shown. In this example node N1 will only be considered as a sending node and node N4 will only be considered as a receiving node.

The extended routing graph now permits any standard combinatorial route construction algorithm, e.g., a shortest-path method, to find the optimal route and total route metric for a given flow. If the origin and destination nodes of the flow are o and d respectively, then the virtual nodes $o^s$ and $d^t$ should be used in the extended routing graph. The optimal route metric is found directly from the extended routing graph, and the route in the original graph is simply constructed by substituting each virtual node by its corresponding original node and similarly for the virtual links.

As can be seen in FIG. 5B, the metrics for the link between two nodes will vary in dependence on the path of which the link is a part, depending on the other links in the path.

The metrics for the paths comprising a single link, or hop, are shown in Table 4:

TABLE 4

| metrics for single-hop paths between sending nodes N1, N2, N3 and destination node N2, N3, N4 | | | |
|---|---|---|---|
| Sender Destination | 1 | 2 | 3 |
| 2 | $m_a$ | | |
| 3 | $m_c$ | $m_d$ | |
| 4 | | $m_b$ | $m_e$ |

For the path between sending node N1 and destination node N3 via node N2, the link metrics are as follows:
From node N1 to node N2: $m_a$
From node N2 to node N3: $m_d+\sigma_d^a$ For the path between sending node N1 and destination node N4 via node N2, the link metrics are as follows:
From node N1 to node N2: $m_a+\sigma_a^b$
From node N2 to node N4: $m_b$ For the path between sending node N1 and destination node N4 via node N3, the link metrics are as follows:
From node N1 to node N3: $m_c$
From node N3 to node N4: $m_e+\sigma_e^c$ For the path between sending node N1 and destination node N4 via both node N2 and N3, the link metrics are as follows:
From node N1 to node N2: $m_a$
From node N2 to node N3: $m_d+\sigma_d^a+\sigma_d^e$
From node N3 to node N4: $m_e$ For the path between sending node N2 and destination node N4 via node N3, the link metrics are as follows:
From node N2 to node N3: $m_d+\sigma_d^e$
From node N3 to node N4: $m_e$ To determine the path metric for a particular path, the link metrics for all links in that path are added. The path having the lowest path metric is generally the one that should be selected.

Figure 6:
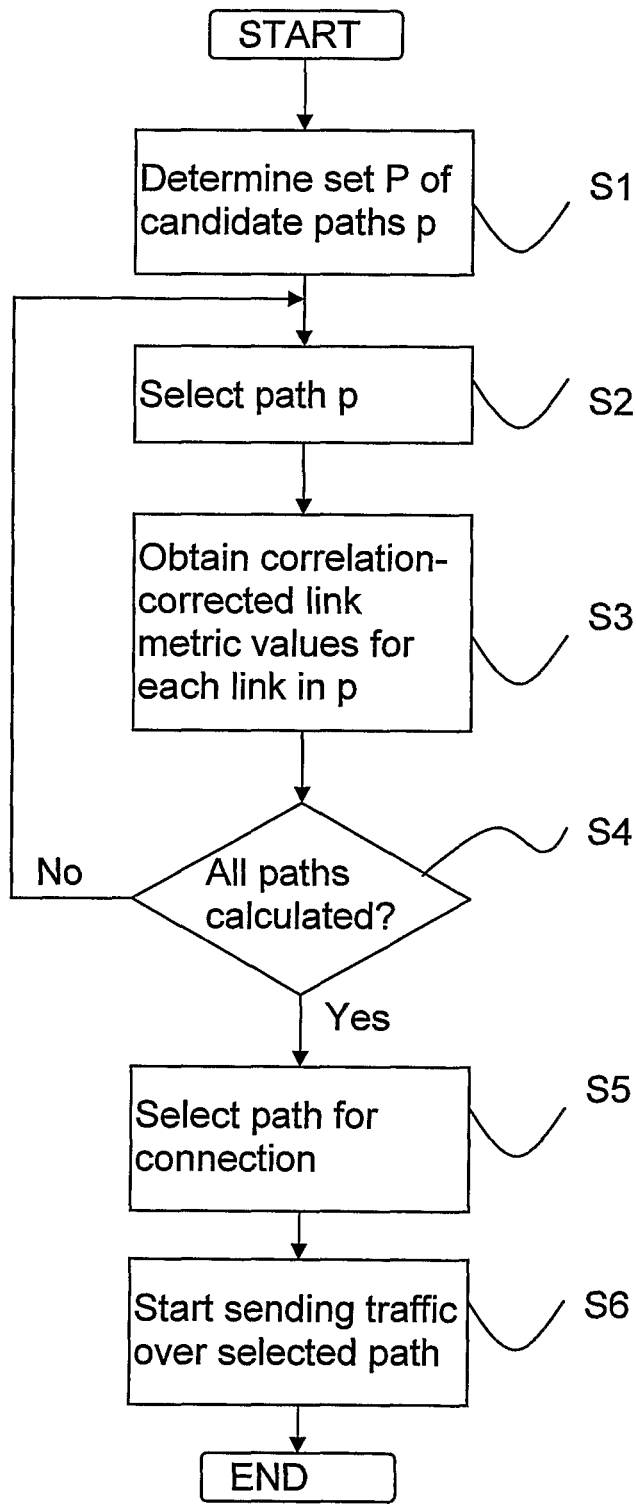
FIG. 6 is a flow chart of the inventive method.

FIG. 6 is a flow chart of the overall method according to the invention.

In step S1 the set P of candidate paths p is determined.

In step S2 a path p in the set P is selected, for which the metrics should be determined.

In step S3 the correlation-corrected link metric value for each link in the path p is calculated. This calculation is based on the cross-correlation vector for the respective link and the current link metric, as explained above.

In step S4 it is determined if the correlation-corrected link metric values have been calculated for all paths. If no, return to step S2 and select a path p for which the link metric values have not been calculated; if yes, go to step S5.

Step S5: The optimal path for the connection is selected, based on the correlation-corrected link metric values for the links in each path. In practice this may involve, for each path, adding the corrected link metric values for all links in the path. The resulting values for all paths can than be compared and the path having the most favourable metric value can be selected.

In an optional step S6 traffic is transmitted on the selected path.

How to obtain the cross-correlation values used in step S3 is discussed above.

Figure 7:
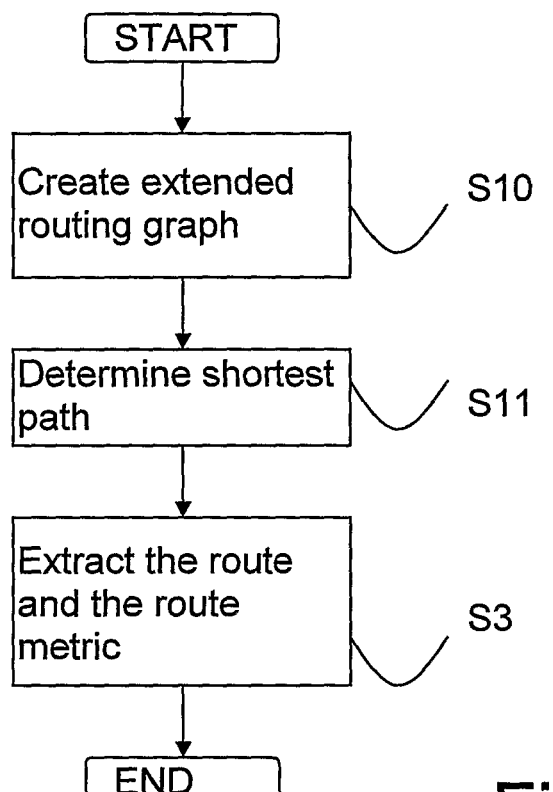
FIG. 7 is a flow chart of the inventive method when an extended routing graph is used.

FIG. 7 is a flow chart of the method according to the invention when an extended routing graph is used, as discussed in connection with FIG. 4, FIG. 5A and FIG. 5B.

Step S10: Create the extended routing graph by introducing virtual nodes and virtual links as described above.

Step S11: Determine the shortest path by applying a standard shortest path algorithm to the routing graph created in step S10.

Step S12: Extract the route and the route metric. The route is found by replacing each virtual node by its corresponding node and each virtual link by its corresponding link. The route metric is identical to the route metric in the extended routing graph.

Note that some metrics may be better when it has a large value (for example, supported rate, link quality, etc) while other metric may be better when it has a small value (for example, delay, number of hops, etc). Different metrics can affect each other. One solution for combining the different metrics into one comparable value can be using a utility function, known per se.

REFERENCES

[1]. Eppstein, D., "Finding the k Shortest Paths," SIAM Journal on Computing, Volume 28, Number 2, 1998.

The invention claimed is:

1. A method of selecting a route for a data transmission flow in a communication network, comprising:
    defining a first route from a sender to a receiver comprising at least a first link having a first link metric, and a second route from the sender to the receiver comprising at least a second link having a second link metric;
    determining a value of at least the first link metric based on a cross-correlation value representing an evaluated change that would occur in the first link metric value if a data flow would already use a link in the communication network other than the first link due to the first link and the other link transmitting on different channels or accessing common resources;
    comparing route metrics for the first and second routes, the route metrics based on the link metric values of the links comprising the routes; and
    calculating a corrected cross-correlation value $\sigma_a^b(\text{new})$ as:

$$\sigma_a^b(\text{new}) = g(\sigma_a^b, \alpha_a^b h(m_a, m'_a))$$

where g and h are functions, $\alpha_a^b$ is a weight factor representing a probable influence of a link b on a link a, $m_a$ is a current link metric value for the link a, and $m'_a$ is a link metric value for the link a when a flow uses a path including the link a,
    wherein one or more method steps are performed by a computational circuit associated with a network node.

2. The method of claim 1 wherein the first route comprises at least two links and the other link considered in the cross-correlation value is included in the first route.

3. The method of claim 1 wherein the first link metric value is calculated on the basis of a link metric cross-correlation vector comprising, for the first link, a cross-correlation value corresponding to another link, and reflecting the change in the link metric value for the first link if the data flow would already use the other link.

4. The method of claim 1 wherein the first link metric value is calculated on the basis of a set of values comprising pairs $(b, \sigma_a^b)$ for which there is a correlation or information exists, b being another link and $(\sigma_a^b)$ being the cross-correlation value reflecting the change in the first link metric value if the data flow would already use the other link.

5. The method of claim 4 wherein the first link metric value is calculated according to the function $\overline{m_a} = f_a(m_a, \sigma_a^P)$, where $\overline{m_a}$ is the first link metric value to be calculated, $m_a$ is the current first link metric value and $\sigma_a^b$ is the cross-correlation value reflecting the change in the first link metric value if the data flow would already use the other link b.

6. The method of claim 5 wherein the first link metric value is calculated according to the function $$\overline{m_a} = m_a + \sum_{b \in P} \sigma_a^b,$$

where $m_a$ is the first link metric value to be calculated, $m_a$ is the current first link metric value, P is the set of all links to be considered, and $\sigma_a^b$ is the cross-correlation value reflecting the change in the first link metric value if the data flow would already use the other link b.

7. The method of claim 1 further comprising calculating the first link metric value based on the change that would occur in the first link metric value if the data flow would already use the first link.

8. The method of claim 1 wherein defining the first route from the sender to the receiver comprises:
    determining a set P of possible paths from the sender to the receiver by using link metrics $m_a$ associated with links and a standard k-shortest path construction method to find a predetermined number k of shortest paths;
    including said k shortest paths in the set P; and
    selecting the first route from the set P.

9. The method of claim 1 wherein the cross-correlation value is determined based on knowledge about how links affect each other.

10. The method of claim 1 wherein the cross-correlation value is determined based on observations over time of how link metrics are correlated.

11. The method of claim 1 further comprising:
    creating an extended routing graph by introducing virtual nodes and virtual links;
    determining a shortest path by applying a standard shortest path algorithm to the extended routing graph;
    extracting a route along the determined shortest path by replacing each virtual node by its corresponding node and each virtual link by its corresponding link; and
    extracting a route metric from a corresponding route metric in the extended routing graph.

12. The method of claim 1 wherein defining the first and second routes is performed by a path determining circuit associated with the network node.

13. The method of claim 1 wherein determining the cross-correlation value is performed by a cross-correlation value determining circuit associated with the network node.

14. The method of claim 1 wherein defining the first and second routes and determining the cross-correlation value are performed by a link metric function circuit associated with the network node.

15. The method of claim 1 wherein the cross-correlation value represents the change that would occur in the first link metric value due to the first link and the other link transmitting on different channels, wherein the different channels are transmitted by different Radio Access Networks.

16. The method of claim 15 wherein the different channels transmitted by different Radio Access Networks share the same spectrum.

17. The method of claim 1 wherein the cross-correlation value represents the change that would occur in the first link metric value due to the first link and the other link accessing common computational resources.

18. The method of claim 1 wherein the cross-correlation value represents the change that would occur in the first link metric value due to the first link and the other link accessing common memory resources.

19. A telecommunications network node, comprising:
a link metric function (LMF) computational circuit operative to monitor or control a link characteristic needed for determining a link metric for a first link starting at the node, the LMF computational circuit further operative to calculate a link metric value of the first link on the basis of a link metric cross-correlation vector comprising a cross-correlation value corresponding to a link other than the first link and reflecting an evaluated change in the first link metric value if a data flow would already use the other link due to the first link and the other link transmitting on different channels or accessing common resources, wherein the LMF computational circuit is operative to calculate the first link metric value according to the function $\overline{m_a} = f_a(m_a, \sigma_a^P)$, where $\overline{m_a}$ is the first link metric value to be determined, $m_a$ is a current first link metric value, and $\sigma_a^b$ is a cross-correlation value reflecting the change in the first link metric value if a data flow would already use other link b.

20. The node of claim 19 wherein the LMF computational circuit is operative to calculate the link metric value on the basis of a set of values comprising pairs (b, $\sigma_a^b$) for which there is a correlation or information exists, b being another link and ($\sigma_a^b$) being the cross-correlation value reflecting the change in the first link metric value if the data flow would already use the other link.

21. The node of claim 19 wherein the LMF computational circuit is operative to calculate the first link metric value according to the function $$\overline{m_a} = m_a + \sum_{b \in p} \sigma_a^b,$$

where $\overline{m_a}$ is the first link metric value to be calculated, $m_a$ is the current first link metric value, P is the set of all links to be considered, and $\sigma_a^b$ is the cross-correlation value reflecting the change in the first link metric value if the data flow would already use the other link b.

22. The node of claim 19 wherein the LMF computational circuit is operative to calculate the link metric value of the first link based on the change that would occur in the first link metric value if the data flow would already use the first link.

23. The node of claim 19 wherein the LMF computational circuit is operative to determine a set P of possible paths by:
using link metrics $m_a$ associated with links and a standard k-shortest path construction method to find a predetermined number k of shortest paths; and
including said k shortest paths in the set P.

24. The node of claim 19 wherein the LMF computational circuit is operative to use the cross-correlation value determined based on knowledge about how the links affect each other.

25. The node of claim 19 wherein the LMF computational circuit is operative to use the cross-correlation value determined based on observations over time of how link metrics are correlated.

26. The node of claim 19 wherein the LMF computational circuit is operative to calculate a corrected cross-correlation value as $\sigma_a^b(\text{new})$ as follows:

$$\sigma_a^b(\text{new}) = g(\sigma_a^b, \alpha_a^b h(m_a, m'_a))$$

where g and h are functions, $\alpha_a^b$ is a weight factor representing a probable influence of a link b on a link a, $m_a$ is the current link metric value for the link a, and $m'_a$ is the link metric value for the link a when a flow uses a path including the link a.

27. The node of claim 19 wherein the LMF computational circuit is operative to:
create an extended routing graph by introducing virtual nodes and virtual links;
determine a shortest path by applying a standard shortest path algorithm to the extended routing graph;
extract a route along the determined shortest path by replacing each virtual node by its corresponding node and each virtual link by its corresponding link; and
extract a route metric from a corresponding route metric in the extended routing graph.

28. A communications network comprising at least one node including a link metric function (LMF) computational circuit operative to monitor or control a link characteristic needed for determining a link metric for a first link starting at the node, the LMF further operative to calculate a link metric value of the first link on the basis of a link metric cross-correlation vector comprising a cross-correlation value corresponding to a link other than the first link and reflecting an evaluated change in the first link metric value if a data flow would already use the other link, wherein the LMF computational circuit is operative to calculate the first link metric value according to the function $\overline{m_a} = f_a(m_a, \sigma_a^P)$, where $\overline{m_a}$ is the first link metric value to be determined, $\overline{m_a}$ is a current first link metric value, and $\sigma_a^b$ is a cross-correlation value reflecting the change in the first link metric value if a data flow would already use other link b.

* * * * *